US011964508B2

(12) United States Patent
Faizan et al.

(10) Patent No.: US 11,964,508 B2
(45) Date of Patent: Apr. 23, 2024

(54) SYSTEM FOR REFILLING OF USED MARKERS

(71) Applicant: Mirza Faizan, Irving, TX (US)

(72) Inventors: Mirza Faizan, Irving, TX (US); Mirza Rizwan, Patna (IN); Maheen Rafique, Southlake, TX (US); Abdul Basit Piracha, Euless, TX (US); Naveed Rauf, Southlake, TX (US); Ali Akbar Kayani, Southlake, TX (US); Meher Saanvi Singh, Southlake, TX (US); Jiya Saanvi Singh, Southlake, TX (US); Maya Ajlouni, Southlake, TX (US); Abdullah Mohiuddin, Roanoke, TX (US); Hassan Saadi, Southlake, TX (US); Hiba Sheikh, Southlake, TX (US); Gibran Saleem, Southlake, TX (US); Saadia Asaf, Aligarh (IN); Mansoor Hasan Khan, Aligarh (IN)

( * ) Notice: Subject to any disclaimer, the term of this patent is extended or adjusted under 35 U.S.C. 154(b) by 340 days.

(21) Appl. No.: 17/462,486

(22) Filed: Aug. 31, 2021

(65) Prior Publication Data

US 2023/0060737 A1 Mar. 2, 2023

(51) Int. Cl.
*B43K 11/00* (2006.01)
*B43K 8/02* (2006.01)

(52) U.S. Cl.
CPC ............ *B43K 11/00* (2013.01); *B43K 11/005* (2013.01); *B43K 8/024* (2013.01)

(58) Field of Classification Search
CPC .............................. B43K 11/00; B43K 11/005
See application file for complete search history.

(56) References Cited

U.S. PATENT DOCUMENTS

| | | | | |
|---|---|---|---|---|
| 3,792,932 A * | 2/1974 | Henriksen | B43K 7/10 | 401/148 |
| 9,193,212 B2 * | 11/2015 | Henry | B43K 15/00 | |
| 10,730,338 B2 * | 8/2020 | Murphy | B43L 19/0018 | |
| 10,889,143 B2 * | 1/2021 | Jangir | B43K 5/10 | |
| 2013/0078025 A1 * | 3/2013 | Turgeman | B43K 7/04 | 401/258 |
| 2013/0167973 A1 * | 7/2013 | Dong | B43K 11/005 | 141/18 |

* cited by examiner

*Primary Examiner* — David P Angwin
*Assistant Examiner* — Bradley S Oliver

(57) ABSTRACT

The invention provides a system for refilling of used markers. The system comprises at least one round plate (1) mounted on a supporting platform, at least one ink reservoir (2) adapted to store ink and positioned at the center of the round plate (1) and one entry hole (3) on the ink reservoir (2) adapted to hold a nib of a marker (6). The round plate (1) of the system is mounted on a motor adapted to rotate the round plate (1) at high speed in a circular motion to dispense ink from the ink reservoir (2) by centrifugal force via the entry hole (3) to refill the marker (6) through the nib.

4 Claims, 2 Drawing Sheets

SYSTEM FOR REFILLING OF USED MARKERS

FIELD OF THE INVENTION

The present invention relates to a system and a method for refillable markers. Particularly, the present invention relates to system, device, and method for filling the used markers with marker-fluid (ink).

BACKGROUND

Markers such as pens, paintbrushes, printers, and the like are used to leave recordable traces upon surfaces. Typically, the recordable traces are left by the application of a marker-fluid, such as paint, an ink, or the like onto the surface. Traditional chalk for blackboards is messy and whiteboard pens have gradually replaced the chalk. However, when the ink is used up the entire marker can only be discarded, causing a great waste of resources and environmental pollution, but also greatly increasing the cost of the pen.

CN96202527 describes a model for an automatic ink suction erasable whiteboard pen. However, it is not leak-proofed and thus is messy and wasteful, both from ink spillage and ink evaporation. The amount of marker-fluid carried by the marker is limited and therefore, as marker-fluid is applied to the surface, the supply of marker-fluid in the marker is periodically exhausted. When insufficient marker-fluid remains in the marker, the marker fluid supply must be replenished or the marker must be thrown away.

Another cited prior art JP3064291U discloses a refillable (recyclable) refill set of marking pen ink by simply and easily refilling the same pen with the same ink. A small-diameter portion of a marking pen with a cap removed in a configuration including a marking pen having a gap around a pen tip and containing an ink occluding body with reduced ink and a replenishing container or a replenishing cylinder. Then, the replenishing container or the replenishing cylinder is closely fitted to replenish the ink. A known ink pen refilling device for supplying ink to a felt pen disclosed in Japanese Utility Model Publication No. 55-14549 has a head. The ink liquid in the replenisher is gradually sucked up by the capillar in the felt pen through the pen tip adhered to the replenishing material by capillary action. Ink is supplied to the pen.

Yet another prior art CN203472372U discloses a white board writing pen ink refilling device. The white board writing pen ink refilling device comprises a pen point ink refilling box and a pen refill ink refilling box. The pen point ink refilling box and the pen refill ink refilling box are separated. The bottom end of the pen point ink refilling box and the bottom end of the pen refill ink refilling box are connected through a through hole. The horizontal height of ink contained in the pen refill ink refilling box is lower than the pen refill ink refilling box. The pen point ink refilling box is provided with a writing pen fixing groove. The pen refill ink refilling box is provided with a pen refill fixing groove. However, these devices have drawbacks. In particular, the white board writing pen ink refilling device are complex in structure, and less in practicability, teaching efficiency is low, energy and costs are high, and the environmentally harmful.

Another prior art US7004660B2 discloses a wet writing implement comprising a shaft for holding a capillary writing tip, a closure cap reversibly fitted on to the shaft for protecting the writing tip, a writing fluid storage means for receiving a writing fluid arranged in the closure cap, a further writing fluid storage means is arranged in the interior of the shaft. Capillarity of the further writing fluid storage means arranged in the shaft is less than that of the writing tip but greater than that of the writing fluid storage means in the closure cap.

By their nature, marker-fluids are generally pigmented and free-flowing. Accordingly, the refilling of markers is typically a messy process. For convenience, therefore, disposable markers are most popular. Besides the possibility of being able to refill the implement with writing fluid, the attempt may also be made to increase the storage capacity of the writing fluid storage means. However, that alternative is frequently confronted with design reasons as a writing implement of that kind should not be of an excessive width and/or length. However, it will be appreciated that frequently disposing of markers is wasteful and costly.

OBJECTS OF THE INVENTION

The following disclosure presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An object of the present invention is to overcome the above-mentioned drawbacks of the prior arts.

Another object of the present invention is to provide an improved and efficient system, device, and method for refilling of the used marker.

Yet another object of the present invention is to reduce the wastage and improper disposal of the used markers.

Yet another object of the present invention is to provide a user-friendly method, device and system for the refilling of the used marker.

SUMMARY OF THE INVENTION

In light of the drawbacks of the prior art, an aspect of the present invention discloses a system for the refilling of the used markers. The system comprises at least one round plate mounted on a supporting platform, at least one ink reservoir adapted to store ink and positioned at the center of the round plate and one entry hole on the ink reservoir adapted to hold a nib of a marker. The round plate of the system is mounted on a motor adapted to rotate the round plate at high speed in a circular motion to dispense ink from the ink reservoir by centrifugal force via the entry hole to refill the marker through the nib.

In an implementation of the aspect as described above, the entry hole of the ink reservoir comprises a valve and a washer adapted to prevent ink leakage from the ink reservoir in idle condition.

In another implementation of the aspect as described above, the round plate of the system comprises a slot with at least one spring adapted to fit the marker on the round plate while the nib of the marker is inserted into the entry hole of the ink reservoir.

In another aspect of the present invention, the invention provides a device for the refilling of the used markers. The system comprises at least one round plate mounted on a supporting platform, at least one ink reservoir adapted to store ink and positioned at the center of the round plate and one entry hole on the ink reservoir adapted to hold a nib of a marker. The round plate of the system is mounted on a motor adapted to rotate the round plate at high speed in a circular motion to dispense ink from the ink reservoir by centrifugal force via the entry hole to refill the marker through the nib.

In another aspect of the present invention, the invention provides a method for the refilling of the used markers. The method comprises steps of fitting a marker on a round plate mounted on a supporting platform, positioning a nib of a marker in an entry hole of at least one ink reservoir storing ink and wherein the method comprises rotating the at least one round plate coupled to a motor or a manually driven bevel gear adapted to rotate the round plate at high speed in a circular motion for dispensing the ink from the ink reservoir by centrifugal force via the entry hole for refilling the marker through the nib.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the embodiments of the present disclosure will be more apparent in the following description taken in conjunction with the accompanying drawings, in which.

Figure 1:
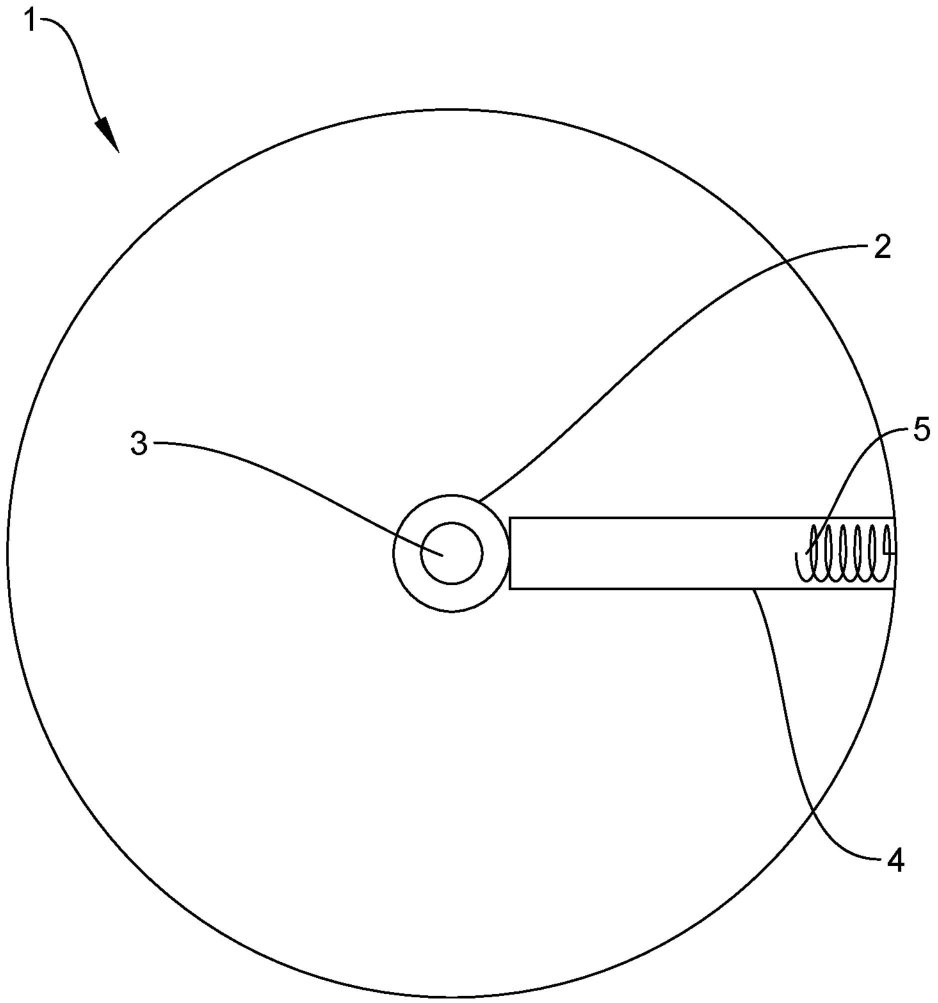
FIG. 1 illustrates a schematic view of the system for refilling the used marker, in accordance with an embodiment of the present disclosure.

Persons skilled in the art will appreciate that elements in the figures are illustrated for simplicity and clarity and may not have been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a nonexclusive inclusion, such that a process or method that comprises a list of steps does not include only those steps but may include other steps not expressly listed or inherent to such process or method. Similarly, one or more devices or subsystems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Embodiments of the present invention will be described below in detail with reference to the accompanying drawings.

FIG. 1 shows the system for refilling the marker. The system as shown in FIG. 1 comprises a round plate (1) mounted on a supporting platform. It shows the ink reservoir (2) which stores the ink and is placed in the center of the round plate (1). It also shows an entry hole (3) of the ink reservoir (2) which accommodates the nib of the marker. Further, it shows a slot (4) with at least one spring (5) positioned inside the slot (4) adapted to fit the marker on the round plate (1) while the nib of the marker is inserted into the entry hole (3) of the ink reservoir (2).

In some embodiments, ink may be any conventional gel, sol, or solution that contains at least one colourant, such as a dye or pigment, and is used to color a surface to produce an image, text, or design. In some embodiments, ink may refer to thicker inks, in paste form, which are used extensively in letterpress and lithographic printing. Thus, the present invention does not limit the scope of the term 'ink' to any existing form.

In some embodiments, the marker may be any conventional marker pen, fine liner, marking pen, felt-tip pen, flow marker, sign pen, sketch pen. The scope of the term marker includes, but not limited to, any pen which has its own ink source and a tip made of porous, pressed fibers such as felt.

Figure 2:
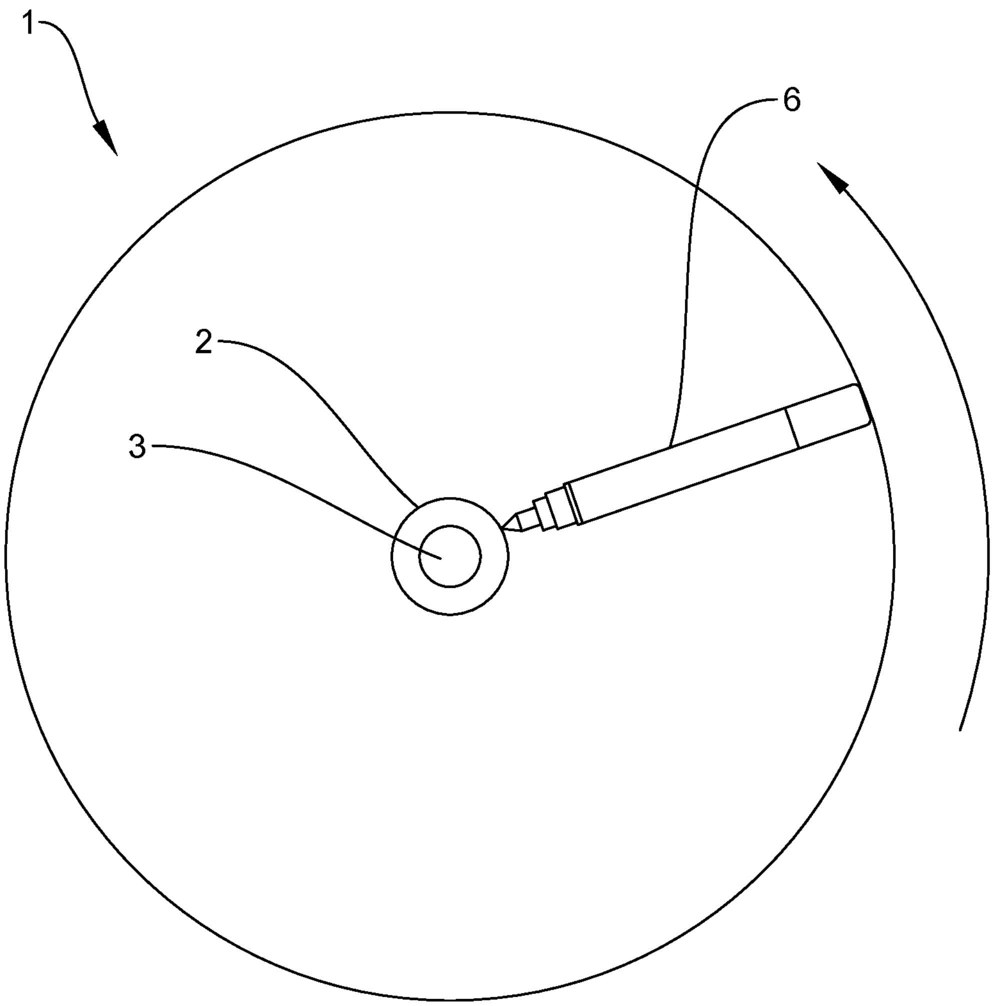
FIG. 2 illustrates a schematic view of the system for refilling the used marker with a refillable marker placed in the system, in accordance with an embodiment of the present disclosure.

FIG. 2 shows the system for refilling the marker (6) with a refillable marker (6) placed in the system. It shows the refillable marker (6) inserted in the slot (4) with nib inside the entry hole (3) of the ink reservoir (2) on the round plate (1).

In an embodiment, the invention provides a system for the refilling of the used markers. The system comprises a round plate (1) mounted on a supporting platform, at least one ink reservoir (2) adapted to store ink and positioned at the center of the round plate (1) and one entry hole (3) on the ink reservoir (2) adapted to hold a nib of a marker (6). The round plate (1) of the system is mounted on a motor adapted to rotate the round plate (1) at high speed to dispense ink from the ink reservoir (2) by centrifugal force via the entry hole (3) to refill the marker (6) through the nib.

In an embodiment, the entry hole (3) of the ink reservoir (2) comprises a valve and a washer adapted to prevent ink leakage from the ink reservoir (2) in idle condition.

In another embodiment, the round plate (1) of the system comprises a slot (4) with at least one spring adapted to fit the marker (6) on the round plate (1) while the nib of the marker (6) is inserted into the entry hole (3) of the ink reservoir (2).

In another embodiment, the invention provides a device for the refilling of the used markers. The system comprises at least one round plate (1) mounted on a supporting platform, at least one ink reservoir (2) adapted to store ink and positioned at the center of the round plate (1) and one entry hole (3) on the ink reservoir (2) adapted to hold a nib of a marker (6). The round plate (1) of the system is mounted on a motor adapted to rotate the round plate (1) at high speed to dispense ink from the ink reservoir (2) by centrifugal force via the entry hole (3) to refill the marker (6) through the nib.

In another embodiment, the invention provides a method for the refilling of the used markers. The method comprises steps of fitting a marker (6) on a round plate (1) mounted on a supporting platform, positioning a nib of a marker (6) in an entry hole (3) of at least one ink reservoir (2) storing ink and wherein the method comprises rotating the at least one round plate (1) coupled to a motor or a manually driven bevel gear adapted to rotate the round plate (1) at high speed for dispensing the ink from the ink reservoir (2) by centrifugal force via the entry hole (3) for refilling the marker (6) through the nib.

Other advantages and embodiments of the present invention obvious from the present disclosure form the part of the present invention and in no way disclaimed by the disclosure of the invention. The present application discloses the invention sufficiently as per the requirements of the patent law for the person skilled in the art to carry out the invention, its obvious embodiments disclosed and not disclosed with ease.

We claim:

1. A system for refilling of used markers, said system comprising:

at least one round plate (1) mounted on a supporting platform;

at least one ink reservoir (2) adapted to store ink and positioned at center of the round plate (1);

at least one entry hole (3) on the ink reservoir (2) adapted to hold a nib of a marker (6);

wherein the at least one round plate (1) is mounted on a motor or a manually driven bevel gear handle adapted to rotate the round plate (1) in a circular motion to dispense ink from the ink reservoir (2).

2. The system for refilling of used markers as claimed in claim 1, wherein the ink is dispensed via the entry hole (3) to refill the marker (6) through the nib.

3. The system as claimed in claim 1, wherein the round plate (1) comprises at least one slot (4), with at least one spring (5) positioned inside the slot (4), adapted to fit the marker (6) on the round plate (1).

4. The system as claimed in claim 3, wherein the nib of the marker (6) is inserted into the entry hole (3) of the ink reservoir (2).

* * * * *